US011204852B2

(12) United States Patent
Ito

(10) Patent No.: US 11,204,852 B2
(45) Date of Patent: Dec. 21, 2021

(54) INFORMATION PROCESSING APPARATUS, METHOD OF CONTROLLING THE SAME, INFORMATION PROCESSING SYSTEM AND STORAGE MEDIUM

(71) Applicant: CANON KABUSHIKI KAISHA, Tokyo (JP)

(72) Inventor: Chie Ito, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/933,093

(22) Filed: Jul. 20, 2020

(65) Prior Publication Data

US 2020/0349048 A1 Nov. 5, 2020

Related U.S. Application Data

(63) Continuation of application No. 15/234,063, filed on Aug. 11, 2016, now Pat. No. 10,754,751.

(30) Foreign Application Priority Data

Aug. 25, 2015 (JP) .............................. JP2015-166185

(51) Int. Cl.
*G06F 3/12* (2006.01)
*G06F 11/32* (2006.01)
*G06F 11/30* (2006.01)

(52) U.S. Cl.
CPC ............ *G06F 11/327* (2013.01); *G06F 3/121* (2013.01); *G06F 3/1229* (2013.01);
(Continued)

(58) Field of Classification Search
None
See application file for complete search history.

(56) References Cited

U.S. PATENT DOCUMENTS 6,490,052 B1 12/2002 Yanagidaira
2008/0123135 A1 5/2008 Inoue
(Continued)

FOREIGN PATENT DOCUMENTS

JP 2000010747 A 1/2000
JP 2001075754 A 3/2001
(Continued)

OTHER PUBLICATIONS

Notification of Reasons for Rescission issued on Jan. 6, 2021 in counterpart Japanese Patent Appln. No. 2015-166185.
(Continued)

*Primary Examiner* — Scott C Sun
(74) *Attorney, Agent, or Firm* — Venable LLP

(57) ABSTRACT

A status notification application displays a status of a peripheral device, and a bidirectional communication module operates as a service application and is capable of performing bidirectional communication with the peripheral device, and the status notification application issues a request to obtain a status of the peripheral device together with a name of the peripheral device to the bidirectional communication module, and the bidirectional communication module specifies a target peripheral device from which to obtain the status based on the name of the peripheral device, and transmits a request to obtain the status to the target peripheral device, and transmits to the status notification application the status sent back from the peripheral device in response to the request to obtain.

15 Claims, 16 Drawing Sheets

(52) U.S. Cl.
CPC .......... *G06F 3/1236* (2013.01); *G06F 3/1285* (2013.01); *G06F 11/3013* (2013.01); *G06F 11/3055* (2013.01); *G06F 11/3065* (2013.01)

(56) References Cited

U.S. PATENT DOCUMENTS

| | | |
|---|---|---|
| 2008/0291483 A1 | 11/2008 | Shimatani |
| 2009/0002752 A1 | 1/2009 | Sugiyama |
| 2009/0059278 A1 | 3/2009 | Fukunishi |
| 2011/0113162 A1 | 5/2011 | Miyasaka |
| 2014/0268233 A1 | 9/2014 | Kawai |
| 2014/0298115 A1 | 10/2014 | Sugiyama et al. |
| 2015/0124288 A1 | 5/2015 | Tajima et al. |

FOREIGN PATENT DOCUMENTS

| | | |
|---|---|---|
| JP | 2002196896 A | 7/2002 |
| JP | 2003-256157 A | 9/2003 |
| JP | 2005128890 A | 5/2005 |
| JP | 2006079138 A | 3/2006 |
| JP | 2006-095889 A | 4/2006 |
| JP | 2006-099399 A | 4/2006 |
| JP | 2006155631 A | 6/2006 |
| JP | 2009230336 A | 10/2009 |
| JP | 2010-277258 A | 12/2010 |
| JP | 2012248083 A | 12/2012 |
| JP | 2012252411 A | 12/2012 |
| JP | 2014178989 A | 9/2014 |
| JP | 2014197304 A | 10/2014 |

OTHER PUBLICATIONS

Japanese Communication of a notice of opposition issued in corresponding Japanese Application No. 2015-166185 dated Jan. 8, 2020.

INFORMATION PROCESSING APPARATUS, METHOD OF CONTROLLING THE SAME, INFORMATION PROCESSING SYSTEM AND STORAGE MEDIUM

CROSS-REFERENCE TO RELATED APPLICATIONS

This application is a Continuation Application of U.S. patent application Ser. No. 15/234,063, filed Aug. 11, 2016, which claims priority to Japanese Patent Application No. 2015-166185, filed Aug. 25, 2015, the entire disclosures of which are hereby incorporated by reference herein.

BACKGROUND OF THE INVENTION

Field of the Invention

The present invention relates to an information processing apparatus, a method of controlling the same, an information processing system, and a storage medium.

Description of the Related Art

Generally, a user checks a display of an operation panel of a printer apparatus if the user wishes to know what the status (state) of the printer apparatus is. Meanwhile, if a sufficient user interface is not equipped in a printer apparatus as with a host-based printer apparatus, a user can check a status of the printer apparatus on a host PC connected to the printer apparatus. In such a case, by a status notification application executed on the PC, it is possible to perform device settings, status display and the like of the printer apparatus connected to the PC.

An architecture called V3 driver (V3 printer driver) is known as an architecture for printer drivers that Windows (registered trademark) of Microsoft Corporation provides. V3 drivers are equipped with a language monitor for realizing bidirectional communication between a print spooler and a printer apparatus. Also, a vendor of each printer apparatus, by customizing the language monitor, obtains status information of a printer apparatus according to a PC and controls the printer (refer to Japanese Patent Laid-Open No. 2006-79138). In Japanese Patent Laid-Open No. 2006-79138, a PC performing bidirectional communication as an RPC server with a language monitor in order to obtain status information of a printer apparatus is described.

An architecture called V4 driver, which is the architecture subsequent to V3 driver, has been supported from Windows 8 (registered trademark). In the V4 driver, customization of the language monitor is not permitted. For this reason, customizing the language monitor to perform bidirectional communication with a printer apparatus ceases to be possible. Thus, an interface for performing bidirectional communication between a PC and a printer apparatus without relying upon customization of a language monitor is provided from the OS. However, the provided interface has the restriction that it cannot be executed during printing. Therefore, it is impossible to realize obtainment of information by bidirectional communication as with the V3 driver.

SUMMARY OF THE INVENTION

An aspect of the present invention is to eliminate the above-mentioned problems with conventional technology.

A feature of the present invention is to provide a technique of solving the foregoing problem by realizing a bidirectional communication with a peripheral device by operating as a service application.

According to a first aspect of the present invention, there is provided an information processing apparatus, comprising: a status display unit configured to display a status of a peripheral device; and a bidirectional communication unit configured to operate as a service application and be capable of performing bidirectional communication with the peripheral device, wherein the status display unit issues a request to obtain a status of the peripheral device together with a name of the peripheral device to the bidirectional communication unit, and wherein the bidirectional communication unit specifies a target peripheral device from which to obtain the status based on the name of the peripheral device, and transmits a request to obtain the status to the target peripheral device, and transmits to the status display unit a status that is sent back from the peripheral device in response to the request to obtain.

According to a second aspect of the present invention, there is provided an information processing system in which a client and a server are connected via a network, and in which the client and the server share a peripheral device connected to the server, wherein the client comprises: a status display unit configured to display a status of a peripheral device, wherein the status display unit issues a request to obtain a status of the peripheral device together with a name of the peripheral device to a bidirectional communication unit of the server configured to operate as a service application of the server and be capable of performing bidirectional communication with the peripheral device connected to the server, and wherein the bidirectional communication unit of the server specifies a target peripheral device from which to obtain the status based on the name of the peripheral device, and transmits a request to obtain the status to the target peripheral device, and transmits to the client a status that is sent back from the peripheral device in response to the request to obtain.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

First Embodiment

Figure 1:
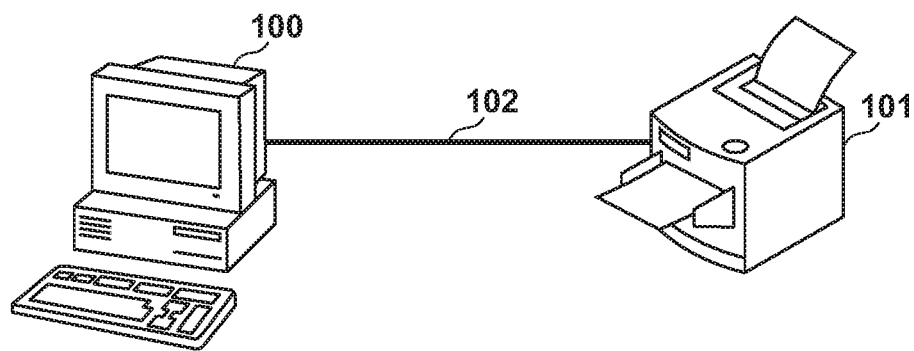
FIG. 1 depicts a view for describing a configuration of an information processing system according to a first embodiment of the present invention.

FIG. 1 depicts a view for describing a configuration of an information processing system according to the first embodiment of the present invention.

The information processing system has a host PC 100 and a printer apparatus 101 which is a peripheral device. A V4 driver of the printer apparatus 101 is installed in the host PC 100. Also, the host PC 100 and the printer apparatus 101 are connected via an I/F (interface) 102. For the I/F 102, there is USB, network, and the like, for example, and the user can select as necessary which of these to use.

Figure 2:
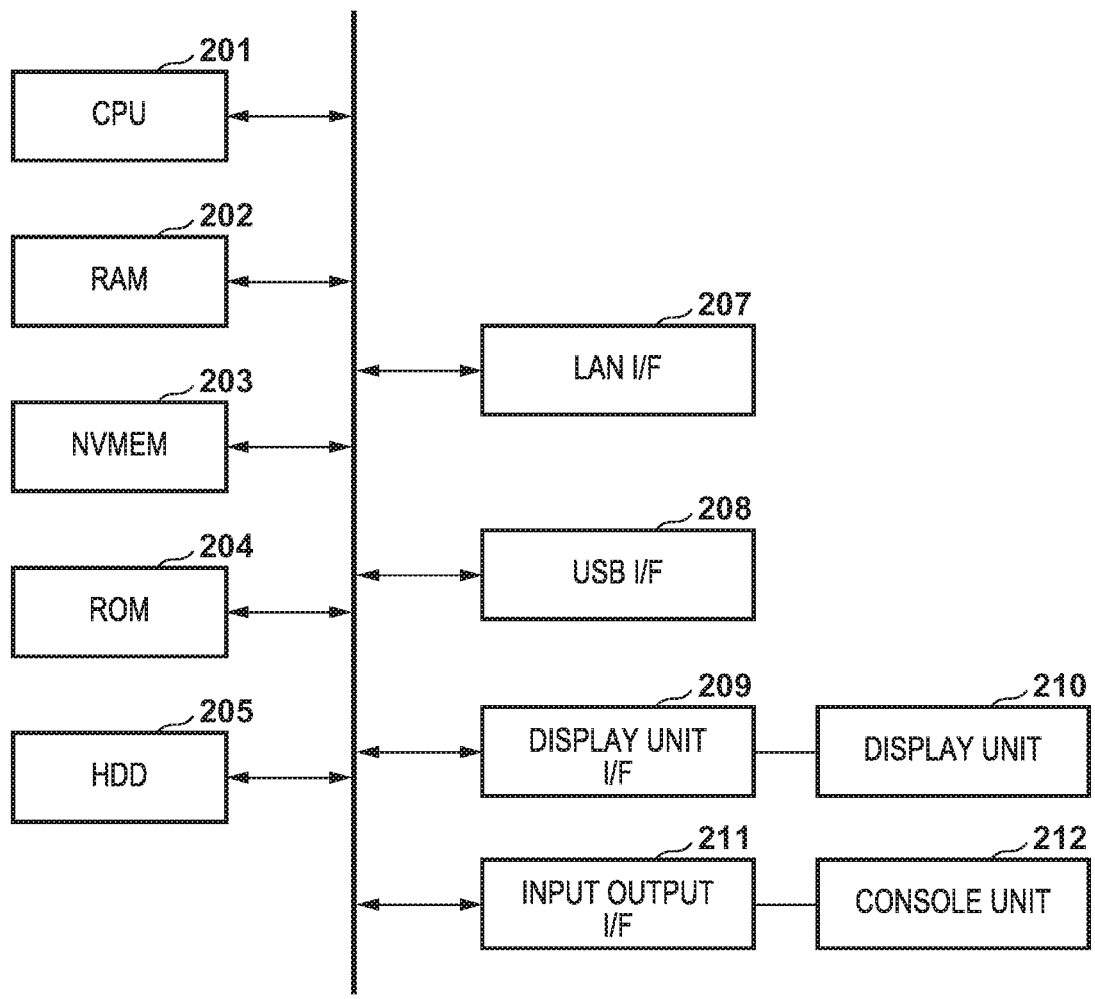
FIG. 2 is a block diagram for describing a hardware configuration of a host PC according to the first embodiment.

FIG. 2 is a block diagram for describing a hardware configuration of the host PC 100 according to the first embodiment.

A CPU 201 is a processor which controls the whole system. A RAM 202 provides a system work memory for operation by the CPU 201, and also is used as a program memory for recording programs. An NVMEM 203 is a non-volatile memory, and records setting information and the like. A ROM 204 is a non-rewritable, non-volatile memory and stores various programs and the like. An HDD 205 is a large capacity data storage apparatus such as a hard disk drive and stores an OS, programs, and the like. A USB I/F 208 is a functional unit for connecting USB devices, and is used for obtaining statuses of other devices connected via USB and for returning statuses. A LAN I/F 207 is a functional unit for connecting to a LAN, and is used for obtaining statuses of other devices connected via LAN and for returning statuses. A display unit interface (I/F 209) controls an interface between a display unit 210 and the CPU 201. An input output I/F 211 controls an interface with a console unit 212 which includes a keyboard and a pointing device for example. The above devices are arranged on a system bus 206.

Here, the CPU 201 executes a boot program stored in the ROM 204, deploys an OS, programs, or the like installed on the HDD 205 into the RAM 202, and by execution thereof, executes a process associated with the host PC 100 described later. Note, the display unit 210 may also be equipped with a touch panel function.

Figure 3:
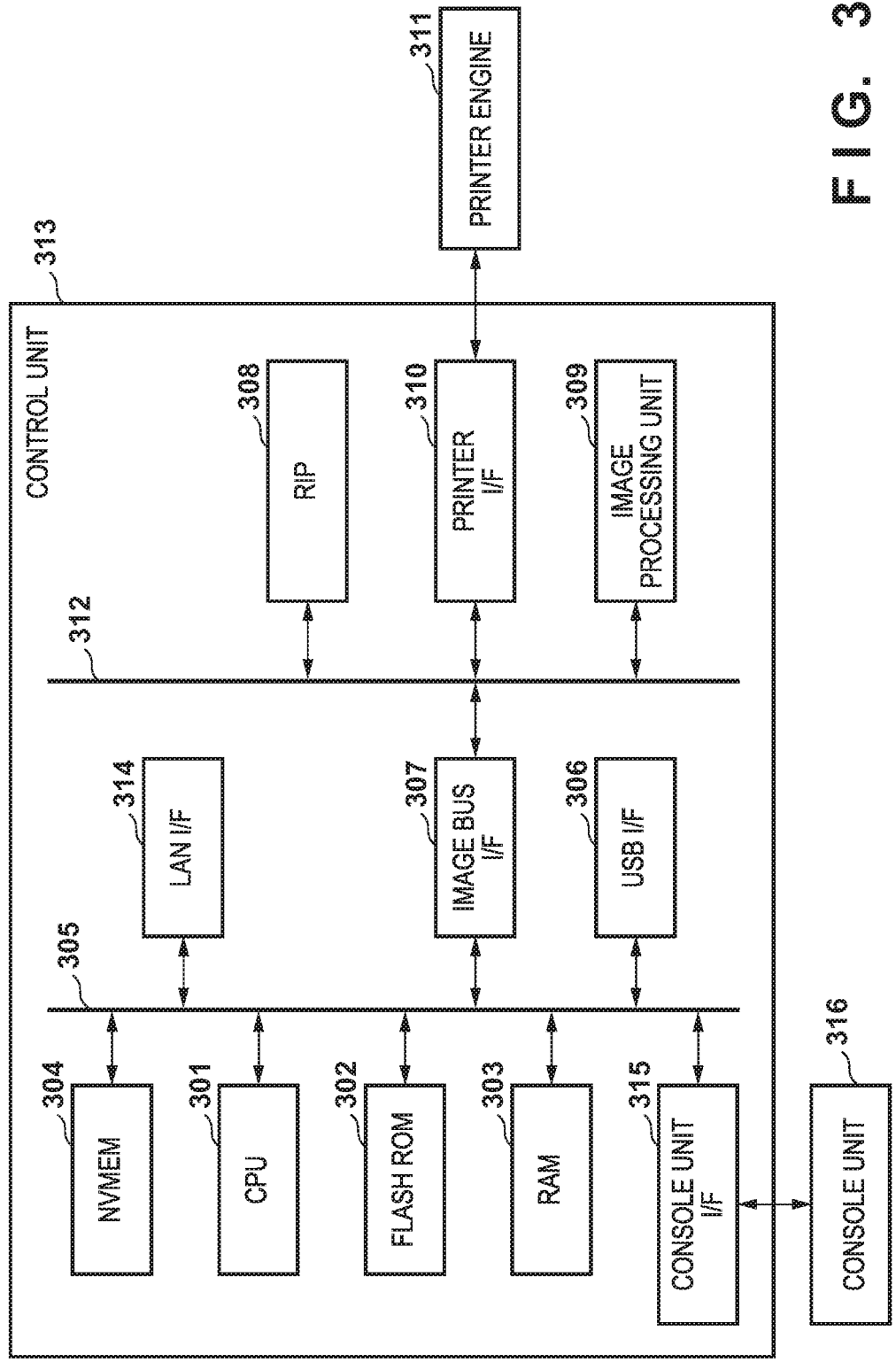
FIG. 3 is a block diagram for describing a hardware configuration of a printer apparatus according to the first embodiment.

FIG. 3 is a block diagram for describing a hardware configuration of the printer apparatus 101 according to the first embodiment.

A controller unit (control unit) 313 performs input and output of image data or device information by connecting to a printer engine 311 which functions as an image output device. A CPU 301 is a processor which controls operations of the printer apparatus 101. A RAM 303 provides a work memory for operation by the CPU 301, and is also used as an image memory for temporarily recording image data, or a program memory for recording programs. An NVMEM 304 is a non-volatile memory, and records setting information and the like. A console unit 316 has a display unit which indicates a device statuses and keys for operating the printer apparatus 101. A console unit I/F 315 controls an interface between the control unit 313 and the console unit 316, and transmits control information of the display unit of the console unit 316. Also, the console unit I/F 315 performs a role of conveying information inputted by a user to the control unit 313 from the console unit 316. A flash ROM 302 stores various control programs for controlling the printer apparatus 101 in rewritable non-volatile memory. A USB I/F 306 makes a USB connection with an external apparatus possible. A LAN I/F 314 makes a LAN connection with an external apparatus possible. The above devices are arranged on a system bus 305.

An image bus I/F 307 is a bus bridge which connects to an image bus 312 which transfers image data at a high speed and the system bus 305, and converts data structures. The image bus 312 is configured by a PCI bus or IEEE 1394. Devices below are arranged on the image bus 312. A raster image processor (RIP) 308 develops vector data such as PDL code into a bitmap image. A printer I/F 310 connects the printer engine 311 and the control unit 313, and performs a supply of a power source and transmission and reception of control commands or a conversion between a synchronous system and an asynchronous system of image data. An image processing unit 309 performs correction, processing, and editing on inputted image data, and performs correction, resolution conversion, and the like on image data to be printed. Also, the image processing unit 309 performs image data rotation, and JPEG compression/decompression processing on multi-level image data, and JBIG, MMR, MH compression/decompression processing on binary image data. The printer engine 311 prints an image on a sheet based on the image data. The print method is electrophotographic and uses a photosensitive drum or a photosensitive belt, or ink-jet or the like which prints an image directly onto a sheet by discharging ink from a minute nozzle array, but any method may be used. Activation of the print operation is initiated by instructions from the CPU 301.

The CPU 301 executes programs deployed from the flash ROM 302 to the RAM 303 when a status of the printer apparatus 101 is queried from the host PC 100 via the USB I/F 306 or the LAN I/F 314. Also, the CPU 301 detects a status of the printer engine 311 and sends back status data based on the detected status to the host PC 100.

Figure 4:
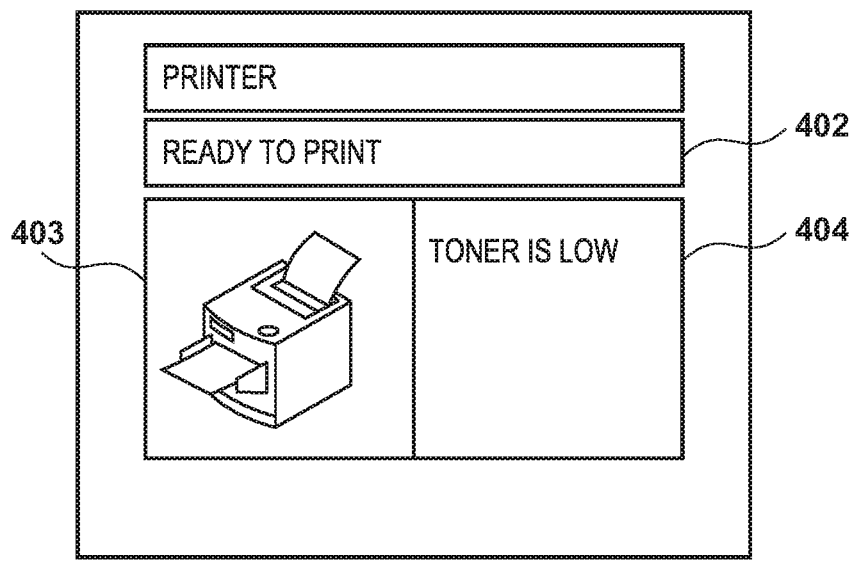
FIG. 4 depicts a view illustrating an example of a screen that a status notification application operating on the host PC according to the first embodiment displays on a display unit.

FIG. 4 depicts a view illustrating an example of a screen that a status notification application operating on the host PC 100 according to the first embodiment displays on the display unit 210.

The status notification application is a program stored in the ROM 204 or the HDD 205 for example, and is deployed into the RAM 202 and executed by the CPU 201. The status notification application performs bidirectional communication with the printer apparatus 101 and switches display of a main message 402 and a status screen 403 in accordance with contents of the status data obtained from the printer apparatus 101. A support message 404 displays a warning about the remaining amount of a consumable or a cancellation procedure or the like at a time of an occurrence of an error. In FIG. 4, a message which indicates that the remaining amount of toner is low is displayed as the support message 404.

Figure 5:
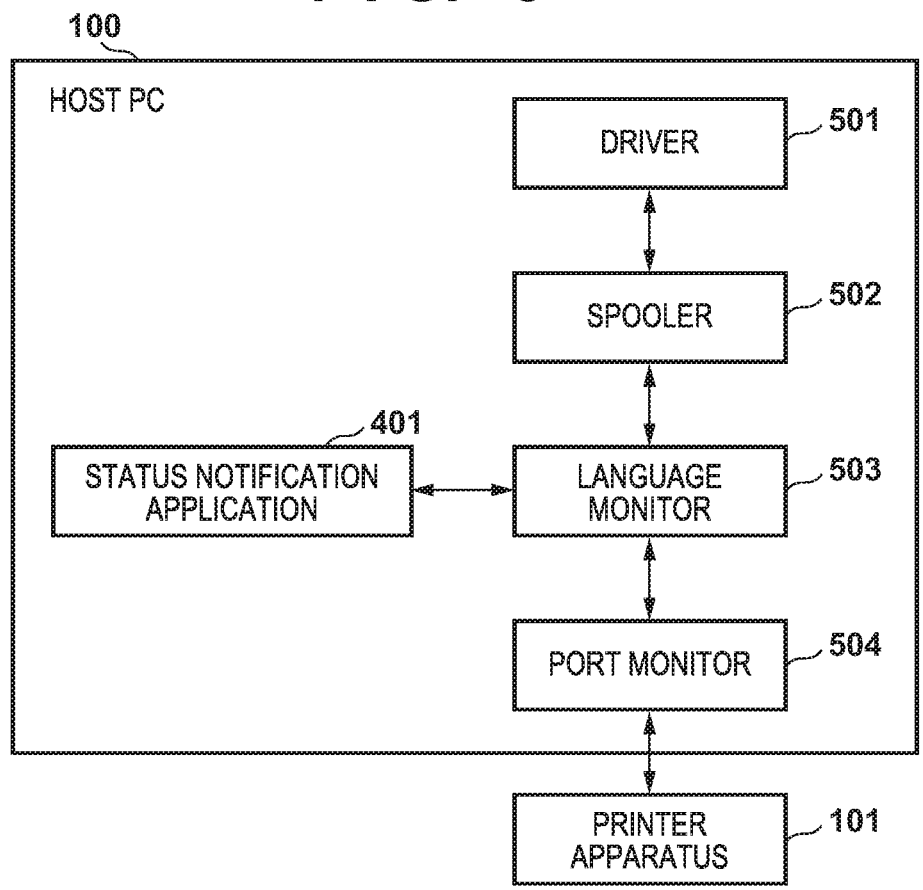
FIG. 5 depicts a view for describing an example configuration in which a status notification application of a generic information processing apparatus performs bidirectional communication with a printer apparatus using a language monitor in the V3 driver architecture.

FIG. 5 is a diagram for describing an example configuration in which a status notification application of a generic information processing apparatus performs bidirectional communication with the printer apparatus 101 using a language monitor in the V3 driver architecture.

A driver 501 accepts a print initiation request requested by an application (not shown). A spooler 502 is a service application which generates print data from data accepted from the application. A language monitor 503 is loaded by the spooler 502 and provides bidirectional communication, printer control commands, or the like with the printer apparatus 101. Also, the language monitor 503 adds processing to the print data accepted from the spooler 502 as necessary. A port monitor 503 performs output processing in accordance with the I/F with the printer apparatus 101.

A status notification application 401 communicates with the language monitor 503, and obtains and displays information of the printer apparatus 101. When the spooler 502 stops due to a problem or user operation, the loaded language monitor 503 is unloaded. Because of this, the status notification application 401 becomes unable to communicate with the printer apparatus 101. For this reason, the status notification application 401 also automatically terminates itself when stoppage of the spooler 502 is detected.

Figure 6:
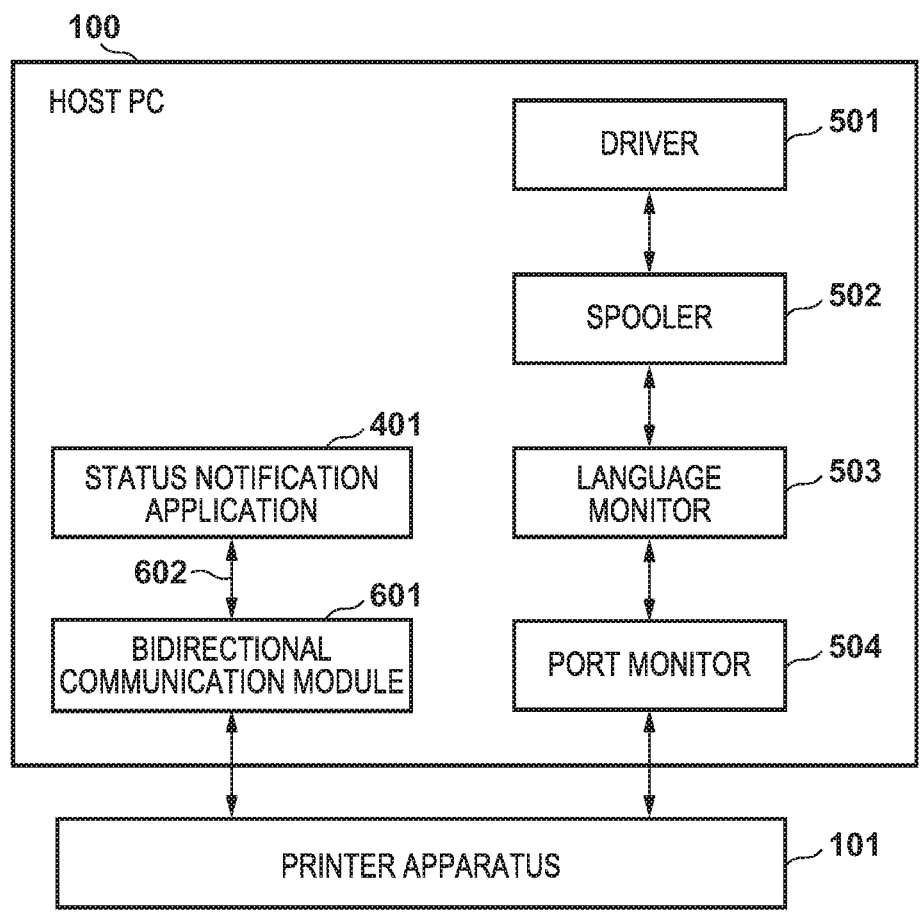
FIG. 6 depicts a view for describing a configuration in which a status notification application of a host PC of the V4 driver architecture performs bidirectional communication with a printer apparatus without using a language monitor according to the first embodiment of the present invention.

FIG. 6 is a diagram for describing a configuration in which the status notification application 401 of the host PC 100 of the V4 driver architecture performs bidirectional communication with the printer apparatus 101 without using a language monitor according to the first embodiment of the present invention. Note that in FIG. 6, portions common to FIG. 5 previously described are indicated by the same reference numerals, so description of these is omitted.

The status notification application 401 uses a bidirectional communication module 601 and a Local Procedure Call (hereinafter LPC) 602 to communicate, and performs bidirectional communication with the printer apparatus 101.

With a generic application, there is processing that cannot be executed due to the fact that when the application is activated by a user to whom authority is not granted, it can only operate with a low authority because it is dependent upon the authority of the user that activates it. On the other hand, the bidirectional communication module 601 is implemented as a service application. Service applications are automatically activated from the OS at a time of booting the host PC 100 and can be temporarily stopped and restarted. Also, the bidirectional communication module 601 becomes capable of execution and processing for which a high access authority is required because the account for activating a service by the OS is a strong authority account.

In the V3 driver architecture of FIG. 5, a strong access authority of a service application is inherited as is because the language monitor 503 is loaded by the spooler 502 which is the service application. In contrast to this, in FIG. 6, by the bidirectional communication module 601 being implemented as a service application, it is possible to similarly perform processing for which a high access authority is required which was possible by the language monitor 503.

In a case when the bidirectional communication module 601 stops due to a problem or a user operation, the status notification application 401 displays that the bidirectional communication module 601 stopped on the display unit 210. Because of this, a user can know that the bidirectional communication module 601 is stopped. Configurations may be taken in which the bidirectional communication module 601 is simultaneously installed when the status notification application 401 is installed, or in which they are installed independently.

Figure 7:
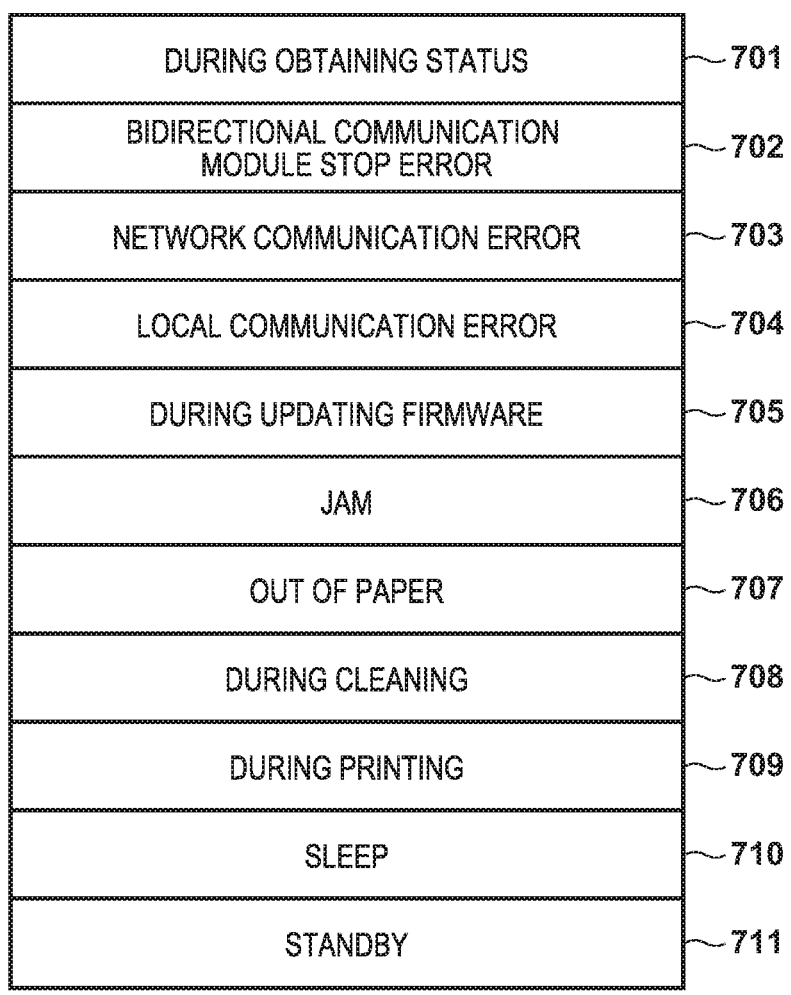
FIG. 7 is a diagram for describing an example of statuses that the status notification application of the host PC displays after obtainment by communication with a printer apparatus via a bidirectional communication module according to the first embodiment.

FIG. 7 depicts a view for describing an example of statuses that the status notification application 401 of the host PC 100 displays after obtaining the statuses by communication with the printer apparatus 101 via the bidirectional communication module 601 according to the first embodiment.

A during obtaining status 701 is a status displayed while making a request to obtain a status to the bidirectional communication module 601 and awaiting a response. Bidirectional communication module stop error 702 is a status displayed when the bidirectional communication module 601 is stopped. The bidirectional communication module 601 stops in a case when stopping of a service is instructed by a user on a screen (not shown) by which it is possible to set an initiation and a stopping of a service, in a case when a problem occurs in the bidirectional communication module 601, or the like. Network communication error 703 is a status which is displayed in a case when communication with the printer apparatus 101 connected via the LAN I/F 207 is not possible. For example, the network communication error 703 is displayed if the power supply of the printer apparatus 101 is cut off, if there is a problem with the LAN I/F 207, or the like. Local communication error 704 is a status which is displayed in a case when communication with the printer apparatus 101 connected via the USB I/F 208 is not possible. For example, the local communication error 704 is displayed if the power supply of the printer apparatus 101 is cut off, if there is a problem with the USB I/F 208, or the like. During updating firmware 705 is a status which is displayed when firmware of the printer apparatus 101 is updating. Jam 706 is a status which is displayed in a case when a sheet is stuck in the printer apparatus 101. At that time, a message indicating a location at which the sheet is stuck is displayed in the support message 404 of the status notification application 401 of FIG. 4 for example. Out of paper 707 is a status which is displayed in a case when there are no sheets in the printer apparatus 101. At that time, information of a necessary paper size is displayed in the support message 404 of the status notification application 401 of FIG. 4 for example. During cleaning 708 is a status which is displayed while the printer apparatus 101 is executing cleaning processing. During printing 709 is a status which is displayed during execution of print processing in the printer apparatus 101. Sleep 710 is a status which is displayed while the printer apparatus 101 is in a sleep state. Standby 711 is a status which displays when the printer apparatus 101 is in a printable state (standby).

Figure 8:
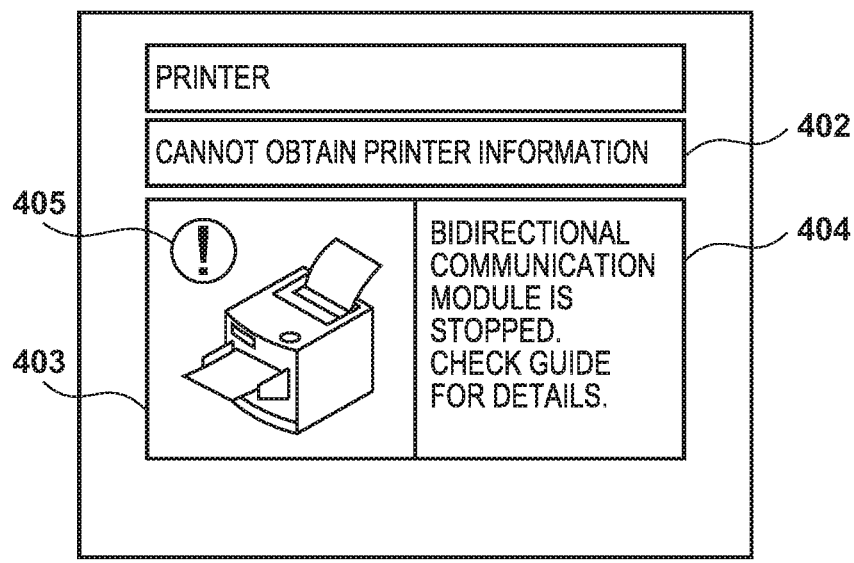
FIG. 8 depicts a view illustrating an example of a bidirectional communication module stop error status that the status notification application of the host PC displays on a display unit according to the first embodiment.

FIG. 8 depicts a view illustrating an example of the status notification application 401 of the host PC 100 displaying the status of bidirectional communication module stop error 702 on the display unit 210 according to the first embodiment.

The main message 402 that communication with the printer apparatus 101 is not possible is displayed and the support message 404 that indicates the bidirectional communication module 601 is stopped and that advises referencing a guide which recites a procedure for restart is displayed. The status screen 403 is displayed adding a mark 405 that indicates that an error has occurred to an image illustrating the printer apparatus 101.

Figure 9:
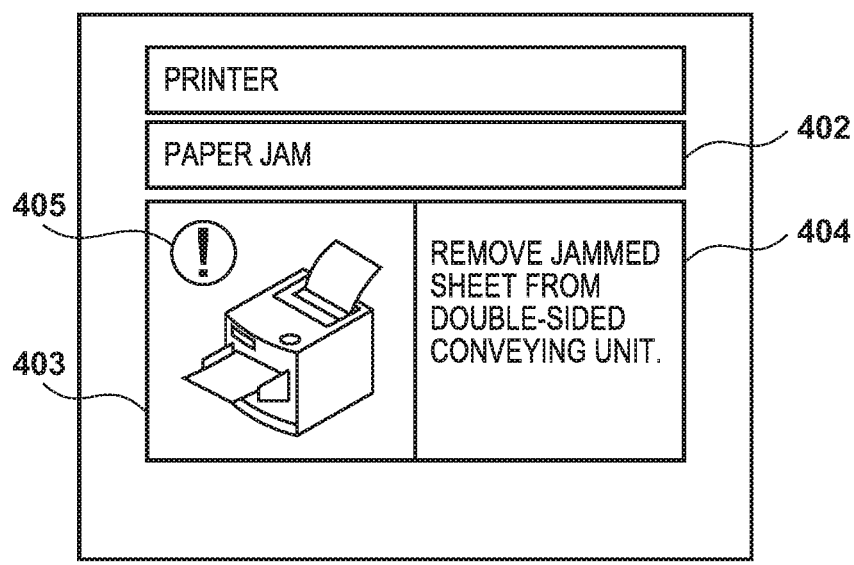
FIG. 9 depicts a view illustrating an example of a jam status that the status notification application of the host PC displays on a display unit according to the first embodiment.

FIG. 9 depicts a view illustrating an example of the status notification application 401 of the host PC 100 displaying the status of jam 706 on the display unit 210 according to the first embodiment.

The main message 402 displays that a sheet is stuck in the printer apparatus 101 and the support message 404 displays that the sheet is stuck in the double-sided conveying unit (not shown) of the printer apparatus 101. The status screen 403 is displayed adding the mark 405 that indicates that an error has occurred to an image illustrating the printer apparatus 101.

Figure 10:
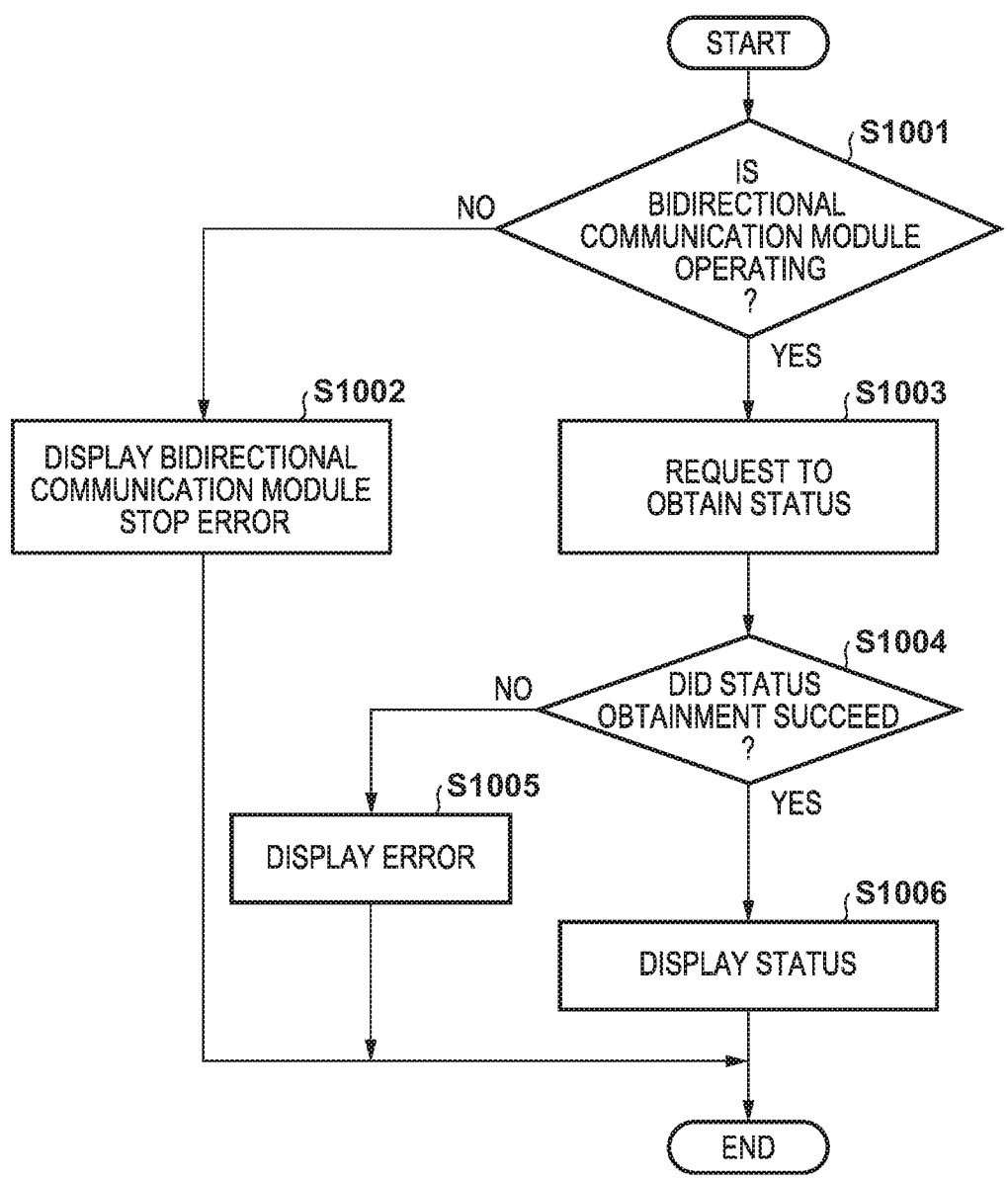
FIG. 10 is a flowchart for describing processing up until the status notification application of the host PC displays the status of the printer apparatus via the bidirectional communication module according to the first embodiment.

FIG. 10 is a flowchart for describing processing up until the status notification application 401 of the host PC 100 according to the first embodiment displays a status of the printer apparatus 101 via the bidirectional communication module 601. Note, a program which executes this processing is stored in the HDD 205, and deployed into the RAM 202 at a time of execution, and the processing illustrated in this flowchart is achieved by the CPU 201 executing that program.

Firstly, the CPU 201 in step S1001 functions as the status notification application 401 and determines whether or not the bidirectional communication module 601 is operating. Here, when the CPU 201 determines that the bidirectional communication module 601 is stopped due to a user operation or a problem internal to the module, the processing proceeds to step S1002 and the CPU 201 displays a status of the bidirectional communication module stop error 702 and terminates the processing.

Meanwhile, when the CPU 201 in step S1001 determines that the bidirectional communication module 601 is operating, the processing proceeds to step S1003, and the CPU 201 uses the LPC 602 to issue a request to obtain a status to the printer apparatus 101. A name of the printer apparatus is transferred at a time of the issuance of the request to obtain the status. Next, the processing proceeds to step S1004 and if the CPU 201 determines that the obtainment of the status from the bidirectional communication module 601 failed due to there being a problem with the connection interface, the power supply of the printer apparatus 101 being off, or the like, and the processing proceeds to step S1005. The CPU 201 in step S1005 displays that the obtainment of the status of the printer apparatus 101 failed on the display unit 210 and terminates the processing. Meanwhile, the CPU 201 in step S1004 advances the processing to step S1006 if the obtainment of the status of the printer apparatus 101 succeeds, and the CPU 201 displays the obtained status on the display unit 210 and terminates the processing.

Figure 11:
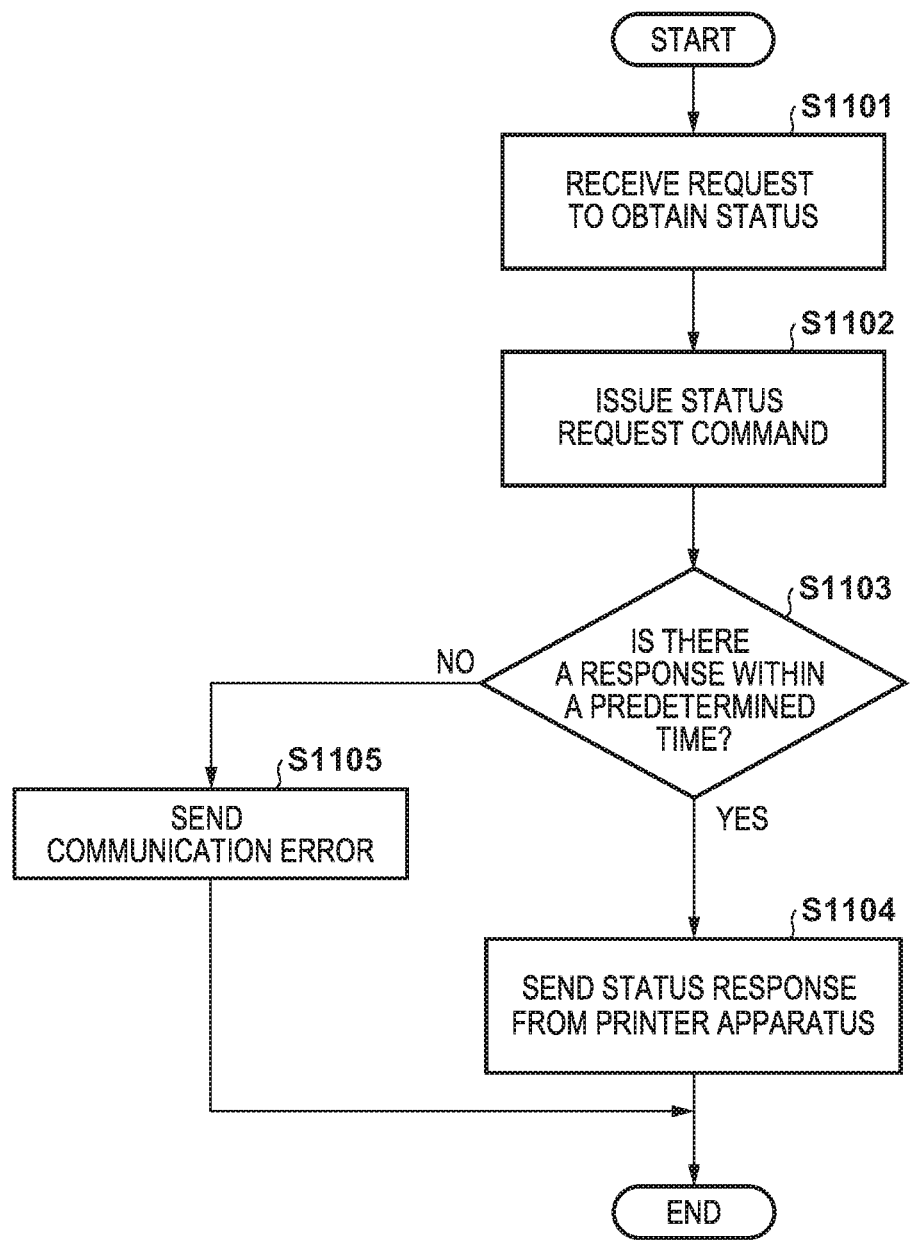
FIG. 11 is a flowchart for describing processing up until the bidirectional communication module, which received a request to obtain a status from the status notification application of the host PC, responds to the status notification application according to the first embodiment.

FIG. 11 is a flowchart for describing processing up until the bidirectional communication module 601, which received a request to obtain a status from the status notification application 401 of the host PC 100, responds to the status notification application 401 according to the first embodiment. Note, a program which executes this processing is stored in the HDD 205, and deployed into the RAM 202 at a time of execution, and the processing illustrated in this flowchart is achieved by the CPU 201 executing that program.

Firstly, the CPU 201 in step S1101 functions as the bidirectional communication module 601, and receives a request to obtain a status from the status notification application 401. At that time, the CPU 201 specifies, from the printer name received together with the request to obtain the status, a target printer apparatus from which to obtain the status. Next, the processing proceeds to step S1102 and the CPU 201 functions as the bidirectional communication module 601, and issues a status request command to the printer apparatus 101 via the LAN I/F 207 or the USB I/F 208. Next, the processing proceeds to step S1103 and the CPU 201 determines whether or not there is a response by the printer apparatus 101 within a predetermined time out duration after issuing the status request command. Here, if it is determined that there is no response, the processing proceeds to step S1105 and the CPU 201 using the LPC 602 sends back a communication error to the status notification application 401, and terminates this processing. Meanwhile, if the CPU 201 in step S1103 determines that there is a response from the printer apparatus 101 within a predetermined duration, the processing proceeds to step S1104. The CPU 201 in step S1104 using the LPC 602 sends back a status obtained from the printer apparatus 101 to the status notification application 401, and terminates the processing.

By the first embodiment as described above, the status notification application can obtain a status of the connected printer apparatus via the bidirectional communication module.

Second Embodiment

Figure 12:
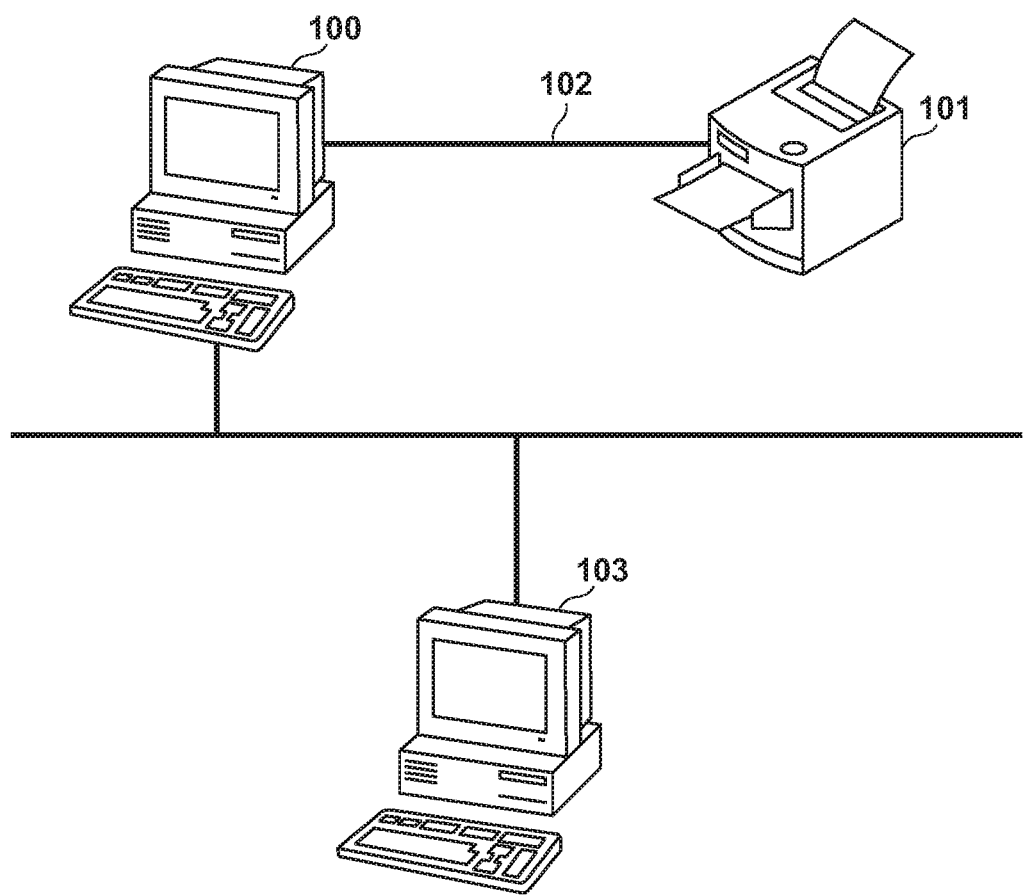
FIG. 12 is a conceptual diagram for describing a configuration of the information processing system according to a second embodiment of the present invention.

FIG. 12 is a conceptual diagram for describing a configuration of an information processing system according to a second embodiment of the present invention.

In the previously described first embodiment, description was given for an example of the information processing system including the host PC 100 and the printer apparatus 101. In FIG. 12, the host PC 100 is a server machine, and a client machine 103 and a server client environment are configured on a network. Here, the host PC 100 and the printer apparatus 101 are connected by an I/F 102 such as a USB or a network.

The client machine 103 installs the printer apparatus 101 connected to the host PC 100 as a shared printer. Additionally, the status notification application 401 of the host PC 100 also is installed. Note, the hardware configuration of the client machine 103 is the same as the configuration of the previously described host PC 100 described with reference to FIG. 2, so description is omitted.

Figure 13:
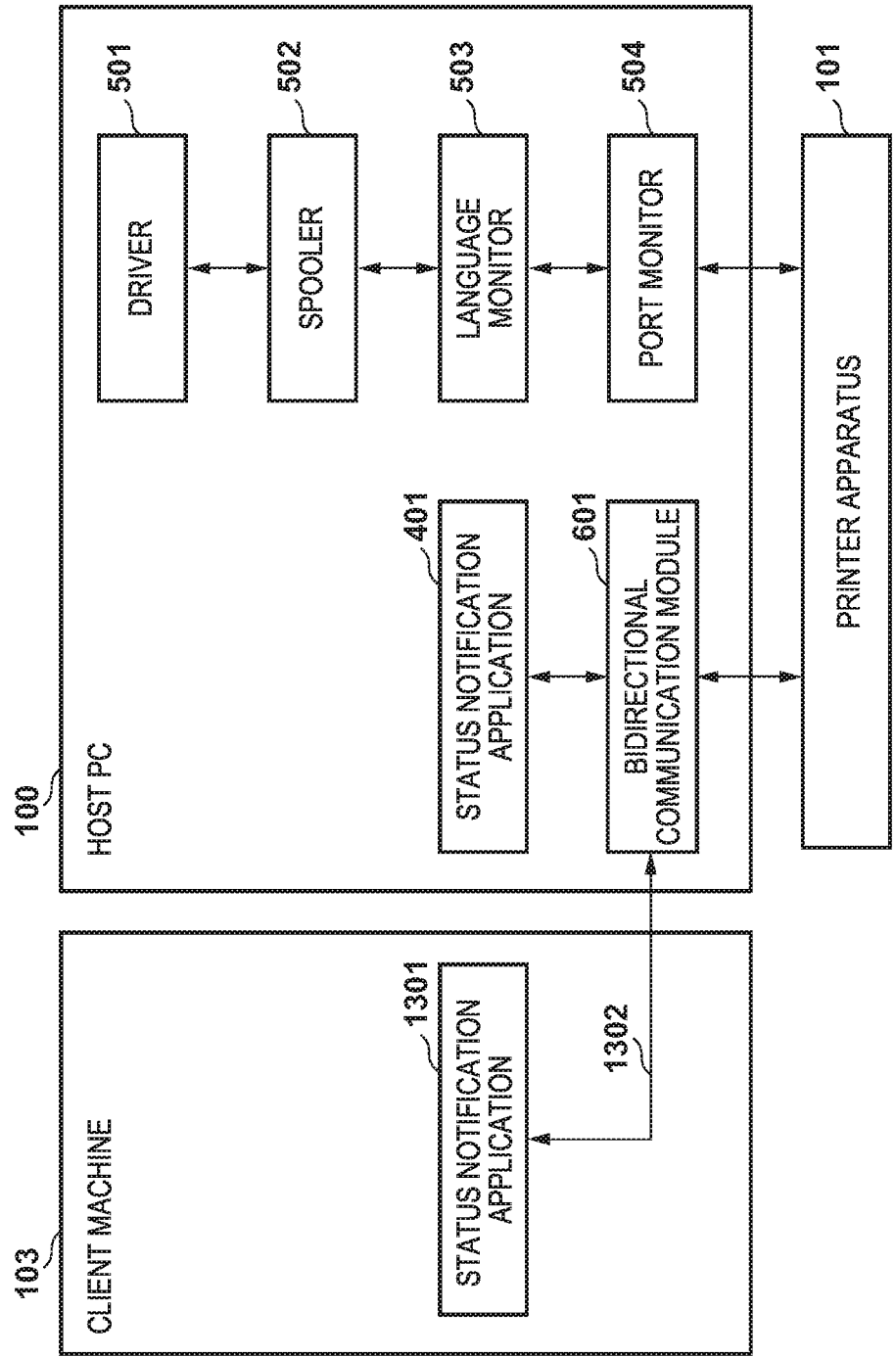
FIG. 13 is a diagram for describing a configuration in which a status notification application of a client machine communicates with a bidirectional communication module on the host PC to display a status of the printer apparatus according to the second embodiment.

FIG. 13 is a diagram for describing a configuration in which a status notification application 1301 of the client machine 103 according to the second embodiment communicates with the bidirectional communication module 601 on the host PC 100 to display a status of the printer apparatus 101. Note that in FIG. 13, portions common to previously described FIG. 6 according to the first embodiment are indicated by the same reference numerals, so description of these is omitted.

In the client machine 103, a driver (not shown) and the status notification application 1301 operate. The status notification application 1301 on the client machine 103 performs communication by a Remote Procedure Call (hereinafter referred to as RPC) 1302 through the network with the bidirectional communication module 601 operating on the host PC 100. Then, the client machine 103 displays the status obtained from the printer apparatus 101.

Figure 14:
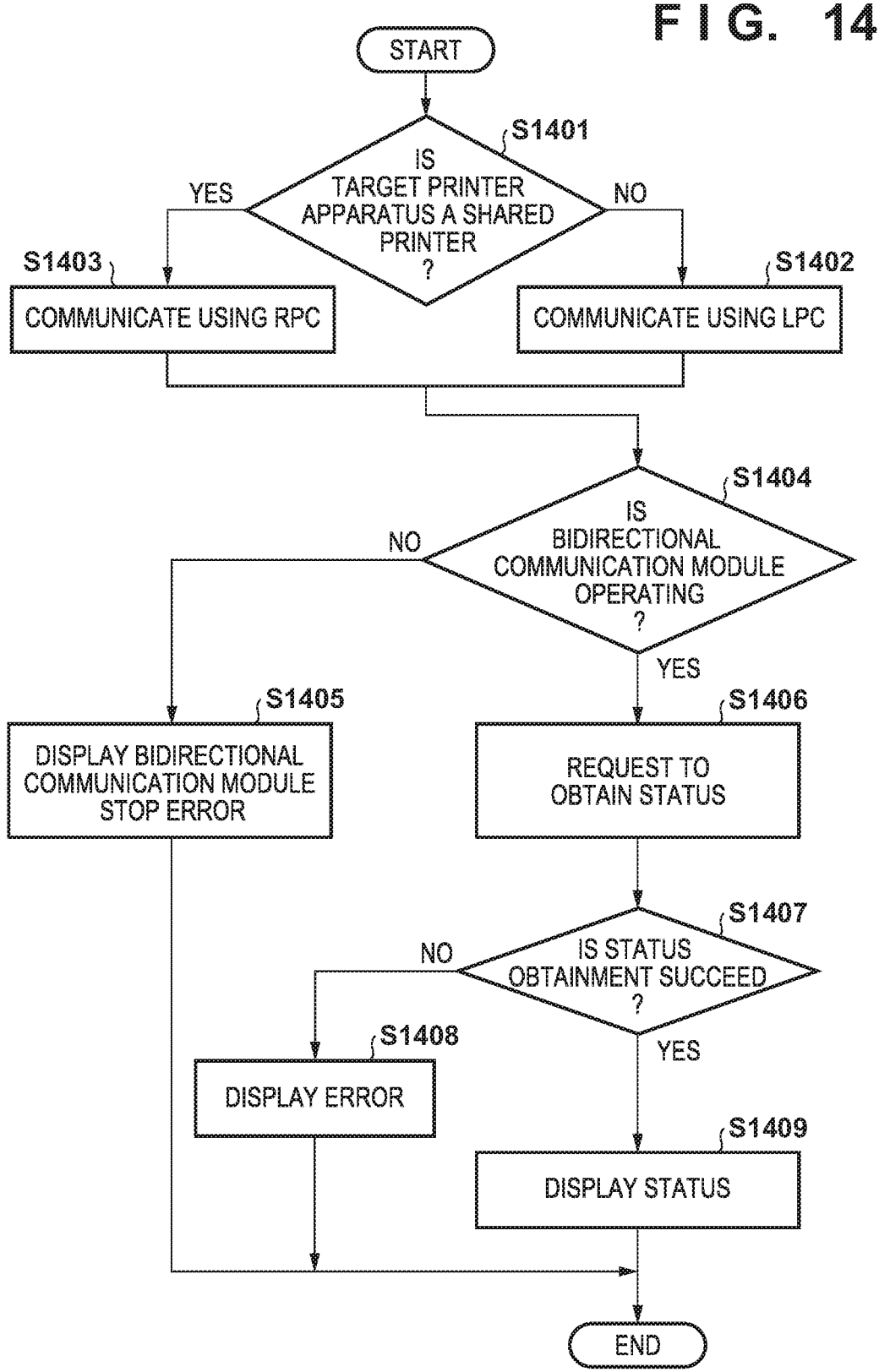
FIG. 14 is a flowchart for describing processing up until the status notification application of the client machine displays the status of the printer apparatus via the bidirectional communication module according to the second embodiment.

FIG. 14 is a flowchart for describing processing up until the status notification application 1301 of the client machine 103 according to the second embodiment displays a status of the printer apparatus 101 via the bidirectional communication module 601. Note, a program which executes the processing is stored in the HDD 205 of the client machine 103, is deployed into the RAM 202 at a time of execution, and the processing which is indicated in this flowchart is achieved by the CPU 201 of the client machine 103 executing the program.

Firstly, in step S1401, a CPU 201 of the client machine 103 (hereinafter referred to as the CPU 201) functions as the status notification application 1301, and determines whether or not the target printer apparatus for which to display the status is a shared printer. In the second embodiment, because the printer apparatus 101 is a shared printer, the processing proceeds to step S1403, and the RPC 1302 is used to communicate with the bidirectional communication module 601, and the processing proceeds to step S1404. Meanwhile, when it is determined to not be a shared printer in step S1401 the processing proceeds to step S1402, and the LPC 602 is used to communicate with the bidirectional communication module 601 and the processing proceeds to step S1404.

The CPU 201 in step S1404 functions as the status notification application 1301 and determines whether or not the bidirectional communication module 601 is operating. Here, when it is determined that the bidirectional communication module 601 is not operating because it is stopped due to a user operation or a problem internal to the module, the processing proceeds to step S1405, the bidirectional communication module stop error 702 is displayed on the display unit 210, and the processing is terminated.

When the CPU 201 in step S1404 determines that the bidirectional communication module 601 is operating, the processing proceeds to step S1406, and the CPU 201 uses the RPC 1302 to issue a request to obtain a status to the printer apparatus 101. A name of the printer apparatus is transferred at a time of the request to obtain the status. Next, the processing proceeds to step S1407 and if the response from the bidirectional communication module 601 is that the obtainment of the status failed due to there being a problem with the connection interface, the power supply of the printer apparatus 101 being off, or the like, the processing proceeds to step S1408. The CPU 201 in step S1408 displays that the obtainment of the status of the printer apparatus 101 failed on the display unit 210 and terminates the processing. Meanwhile, if it is determined that obtainment of the status has succeeded in step S1407, the processing proceeds to step S1409, and the obtained status of the printer apparatus 101 is displayed on the display unit 210, and the processing is terminated.

Figure 15:
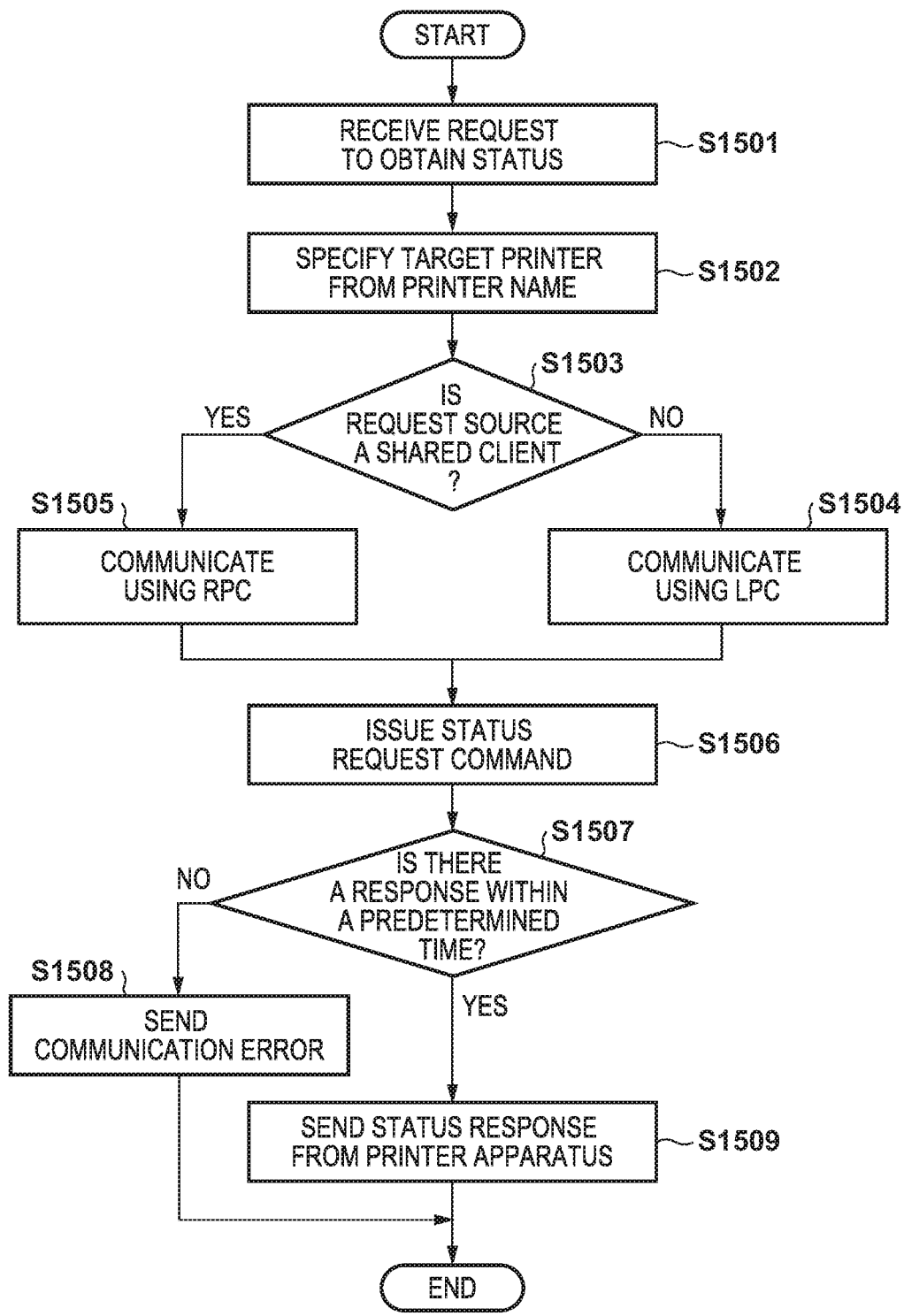
FIG. 15 is a flowchart for describing processing up until the bidirectional communication module, which received a request to obtain a status from the status notification application of the client machine, responds to the status notification application according to the second embodiment.

FIG. 15 is a flowchart for describing processing up until the bidirectional communication module 601, which received the request to obtain the status of the printer apparatus 101 from the status notification application 1301 of the client machine 103, responds to the status notification application 1301 according to the second embodiment. Note, a program which executes the processing is stored in the HDD 205 of the client machine 103, is deployed into the RAM 202 at a time of execution, and the processing which is indicated in this flowchart is achieved by the CPU 201 of the client machine 103 executing the program.

Firstly, in step S1501, the CPU 201 of the client machine 103 (hereinafter referred to as the CPU 201) functions as the status notification application 1301, and receives the request to obtain the status of printer apparatus. Next, the processing proceeds to step S1502, and the CPU 201 specifies, from the printer name received together with the request to obtain the status, a target printer apparatus from which to obtain the status. Next, the processing proceeds to step S1503 and the CPU 201 determines from the format of the name of the printer apparatus whether or not the status obtainment request source is a shared client. In the second embodiment, the status notification application 1301 which is the issuing source of the status obtainment request operates in the client machine 103 which is a shared client. Accordingly, the processing proceeds to step S1505, and communication between the status notification application 1301 and the bidirectional communication module 601 uses the RPC 1302 to communicate with the issuing source of the obtainment request, and the processing proceeds to step S1506. Meanwhile, when it is determined to not be a shared client, the processing proceeds to step S1504, and the LPC 602 is used to communicate with the issuing source of the obtainment request, and the processing proceeds to step S1506.

In this way, when step S1504 or step S1505 is executed, the processing proceeds to step S1506, and the CPU 201 functions as the bidirectional communication module 601, and issues the status request command to the printer apparatus 101 via the LAN I/F 207 or the USB I/F 208. Then, the processing proceeds to step S1507 and the CPU 201 determines whether or not there is a response from the printer apparatus 101 within the predetermined time out duration, and if there is no response, the processing proceeds to step S1508. In step S1508 the CPU 201 using the RPC 1302 sends back a communication error to the status notification application 1301, and terminates this processing. Meanwhile, if the CPU 201 in step S1507 determines that there is a response from the printer apparatus 101 within the predetermined time out duration, the processing proceeds to step S1509. The CPU 201 in step S1509 using the RPC 1302 sends back a status obtained from the printer apparatus 101 to the status notification application 1301, and terminates the processing.

By the second embodiment, as described above, the client machine connected to the host PC, can obtain the status of the printer apparatus and display the printer apparatus connected to the host PC as the shared printer.

Third Embodiment

In recent years, in mission critical systems that require nonstop operation, use of a server cluster is increasing. The server cluster coordinates a plurality server systems and is shown as if it was a single server by providing a common interface to a client (virtual server). By employing such a server cluster, even if a malfunction occurs in one of the servers, high operability may be provided because work can be continued in another server. Servers in the cluster are capable of functioning in various roles such as a file server, a database server, and a print server.

Figure 16:
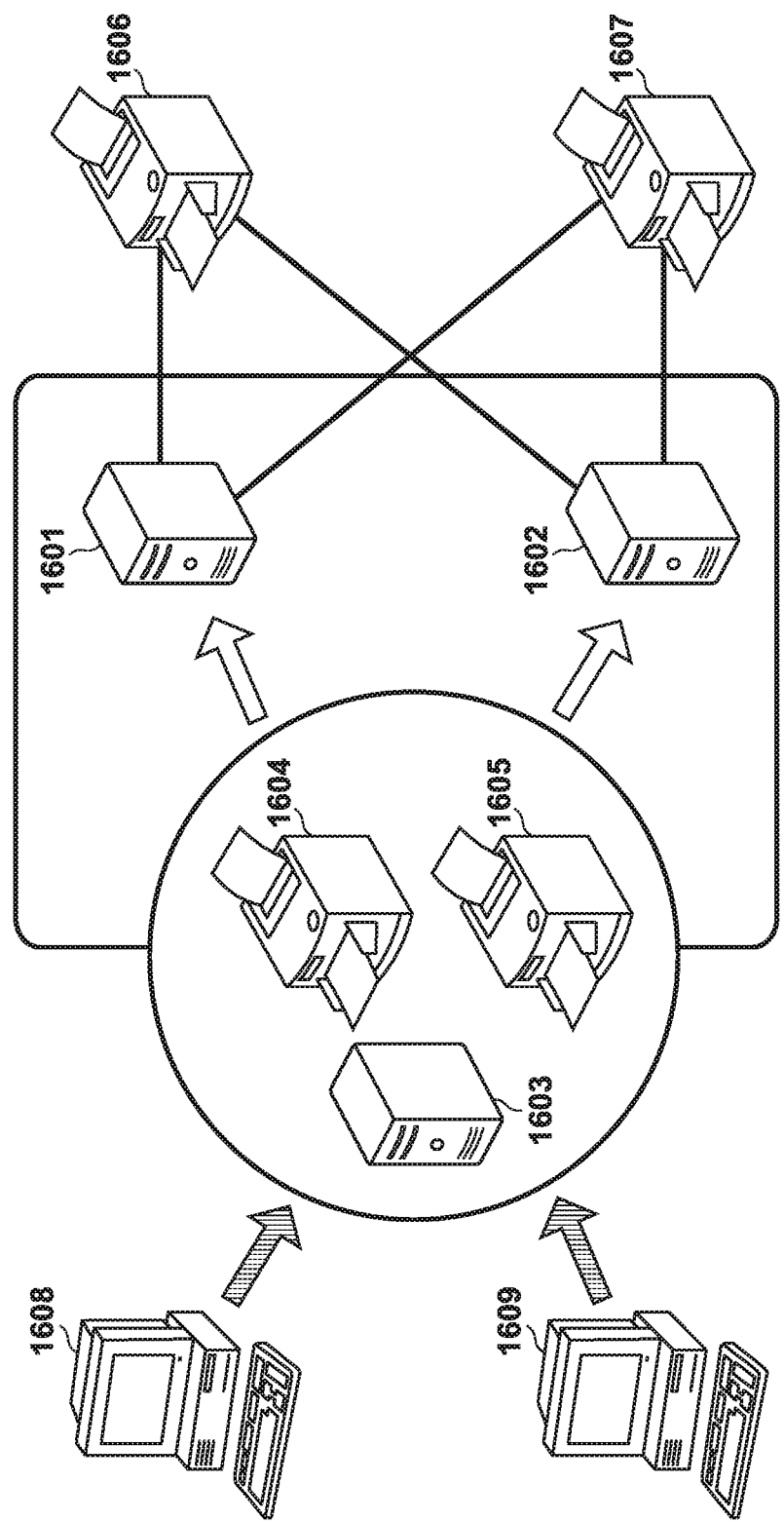
FIG. 16 is a configuration diagram for describing a server cluster that realizes a clustered print server according to a third embodiment of the present invention.

FIG. 16 is a configuration diagram for describing a server cluster that realizes a clustered print server according to a third embodiment of the present invention.

Nodes 1601 and 1602 are physical servers which configure the cluster. The nodes 1601 and 1602 are divided into either an operation system or a standby system respectively and processing is handed over to a servers of the standby system in a case when a malfunction occurs in one that is operating (a failover). The nodes 1601 and 1602 install printers 1606 and 1607, respectively, and also install the status notification application 401 which handles the printers 1606 and 1607. Note, printers that can be clustered are only network printers.

In client machines 1608 and 1609, a virtual server 1603 configured by the nodes 1601 and 1602 appears as a single server. In this way, the printers 1606 and 1607 respectively installed in the nodes 1601 and 1602 are registered to the virtual server 1603. Because of this, virtual printers 1604 and 1605 are added to the virtual server 1603, and the client machines 1608 and 1609 become capable of installing the virtual printers 1604 and 1605 as shared printers. Additionally, the client machines 1608 and 1609 install the status notification application 401 which handles the virtual printers 1604 and 1605.

When a job is input from the client machine 1608 (1609) to the virtual printer 1604 or 1605, the job is sent to the node 1601 or 1602 during operation by a function of the OS. Then, the job is transmitted to the installed printer 1606 or 1607.

The status notification application 401 which operates on the client machine 1608 (1609) communicates with the bidirectional communication module 601 which operates on the node 1601 or 1602 during an operation to display a status of the printer. Normally if the names of the printers are known, the bidirectional communication module 601 can specify the printer for which a status is requested from the printers installed within the machine that itself operates.

In contrast to this, in a server cluster environment, the client machines 1608 and 1609 only know the names of the virtual printers 1604 and 1605 on the virtual server 1603. The bidirectional communication module 601 of the node 1601 or 1602 can specify which printer's status is requested only by the name of the printer because there is no means for linking the virtual printers 1604 and 1605 and the printers 1606 and 1607. Accordingly, the client machines 1608 and 1609 together with the names of the printers of the virtual printers 1604 and 1605 notify a port name and a driver name to the bidirectional communication module 601 of the node 1601 or 1602 to request obtainment of the status. Here, the port name is automatically generated by the OS in a form including an IP address. With this, the bidirectional communication module 601 extracts the IP address from the port name and specifies the IP address of the printer. Also, the bidirectional communication module 601, with the specified IP address, returns the status of the printer if a printer that matches the notified driver name is installed in the node 1601 or 1602 in which it itself operates. Also, in a case when it the printer not found, the network communication error 703 is returned.

Figure 17:
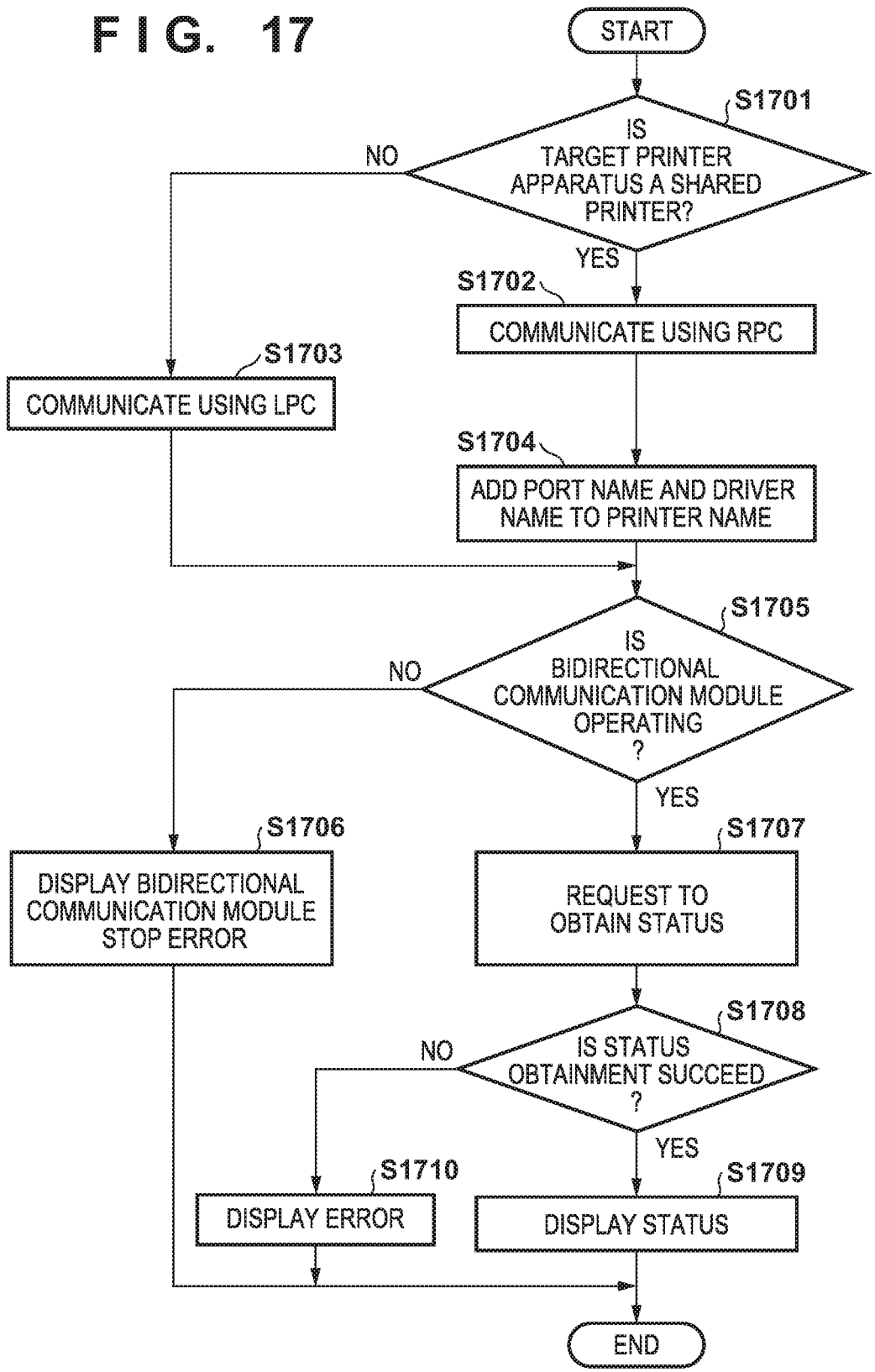
FIG. 17 is a flowchart for describing processing up until the status notification application operating on the client machine displays a status of a printer after obtaining it via the bidirectional communication module operating on a node according to a third embodiment.

FIG. 17 is a flowchart for describing processing up until the status notification application operating on the client machine 1608 (1609) displays a status of a printer after obtaining it via the bidirectional communication module operating on a node according to a third embodiment. In the third embodiment, the node 1601 is currently operating. Also, the printer whose status was requested is the virtual printer 1604, and the virtual printer 1604 is actually the printer 1606. Note, a program which executes the processing is stored in the HDD 205 of the client machine 1608, is deployed into the RAM 202 at a time of execution, and the processing which is indicated in this flowchart is achieved by the CPU 201 of the client machine 1608 executing the program.

Firstly, in step S1701, a CPU 201 of the client machine 1608 (hereinafter referred to as the CPU 201) functions as the status notification application 1301, and determines whether or not the printer for which to display the status is a shared printer. In the third embodiment, because the virtual printer 1604 is the shared printer, the processing proceeds to step S1702, and the CPU 201 uses the RPC 1302 to communicate with the bidirectional communication module 601. Next, the processing proceeds to step S1704 and the CPU 201 adds the port name and the driver name to the name of the printer which is transferred at a time of the request to obtain the status, and the processing proceeds to step S1705. Meanwhile, when it is determined to not be a shared printer in step S1701, the processing proceeds to step S1703, and the LPC is set to be used, and the processing proceeds to step S1705.

The CPU 201 in step S1705 functions as the status notification application 1301 and determines whether or not the bidirectional communication module 601 is operating. Here, when it is determined that the bidirectional communication module 601 is not operating because it is stopped due to a user operation or a problem internal to the module, the processing proceeds to step S1706, the bidirectional communication module stop error 702 is displayed, and the processing is terminated.

Meanwhile, when in step S1705 it is determined that the bidirectional communication module 601 is operating, the processing proceeds to step S1707, and the CPU 201 uses the RPC 1302 to issue a request to obtain a status to the virtual printer 1604. At that time, the name of the printer which added the port name and the driver name transfers to the request to obtain the status. Next, the processing proceeds to step S1708 and the CPU 201 determines whether or not a response from the bidirectional communication module 601 is that the status is successfully obtained. Here, if the obtainment of the status from the printer 1606 failed due to the power supply of the printer 1606 being off, a problem of the connection interface, or the like, for example, the processing proceeds to step S1710. The CPU 201 in step S1710 displays that the obtainment of the status failed on the display unit 210 and terminates the processing. Meanwhile, if it is determined that obtainment of the status has succeeded in step S1708, the processing proceeds to step S1709, and the CPU 201 displays the obtained status of the printer 1606 on the display unit 210, and terminates the processing.

Figure 18:
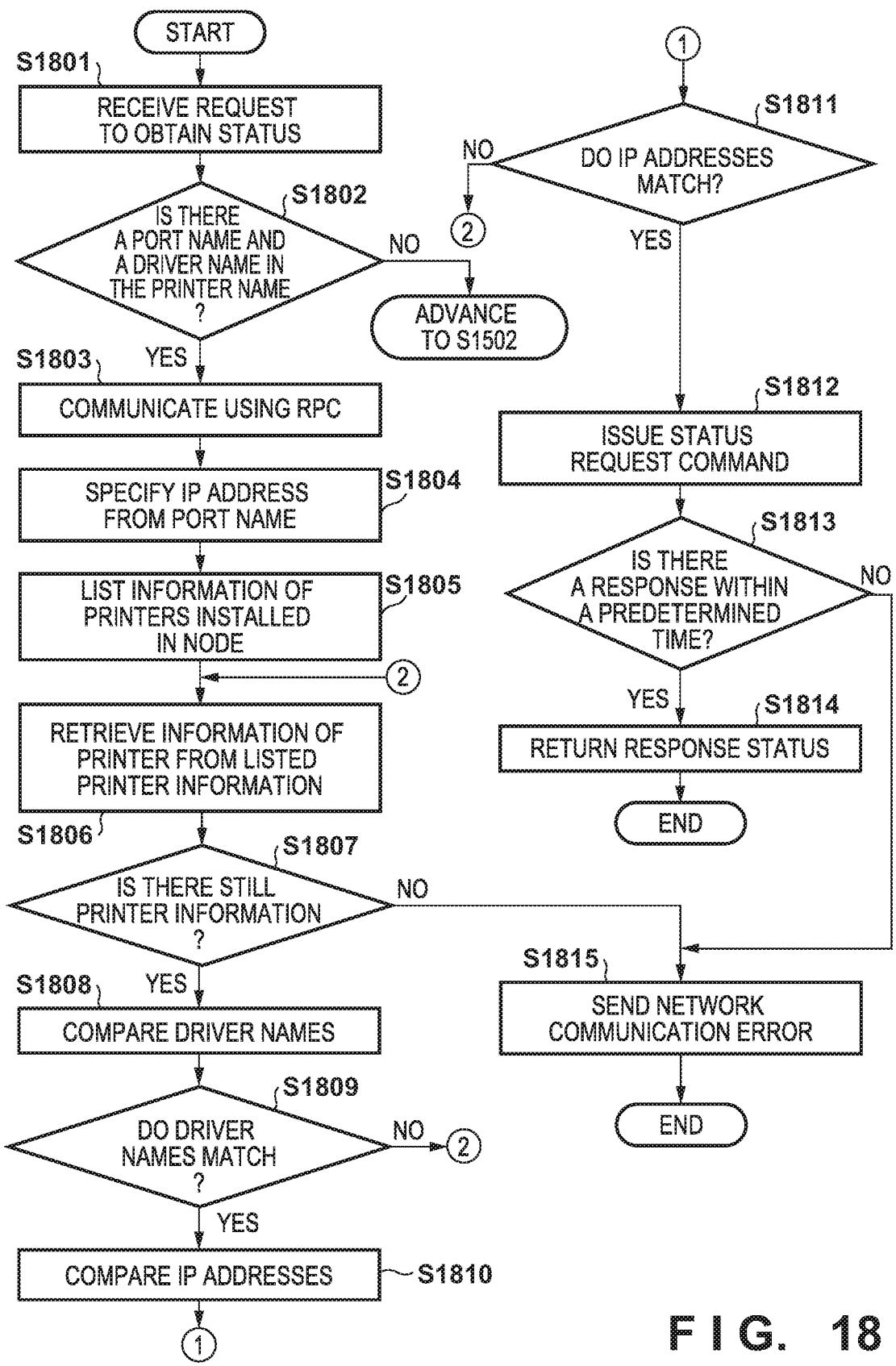
FIG. 18 is a flowchart for describing processing for when the bidirectional communication module operating on the node accepts a request to obtain a status of a printer linked to a virtual printer from a client machine according to a third embodiment.

FIG. 18 is a flowchart for describing processing for when the bidirectional communication module 601 operating on the node 1601 accepts a request to obtain a status of the printer 1606 linked to the virtual printer 1604 from a client machine according to a third embodiment. Note, a program which executes the processing is stored in the HDD 205 of the node 1601, deployed into the RAM 202 at a time of execution, and by the CPU 201 of the node 1601 executing the program, the processing illustrated in this flowchart is achieved.

Firstly, the CPU 201 of the node 1601 in step S1801 (hereinafter referred to as the CPU 201) functions as the bidirectional communication module 601, and receives a request to obtain a status of a printer. Next, the processing proceeds to step S1802 and the CPU 201 determines whether or not a port name and a driver name are added to the name of the printer received together with the request to obtain the status. Here, if it is determined that a port name and a driver name are added, the processing proceeds to step S1803, and the RPC 1302 is used to communicate with the status notification application 1301 which is the request source, and the processing proceeds to step S1804. Meanwhile, if it is determined that the port name and the driver name are not added to the name of the printer in step S1802, the processing proceeds to step S1502 of FIG. 15. In such a case, because it is the same as in the previously described flowchart of FIG. 15, description is omitted.

The CPU 201 in step S1804 extracts the IP address from the obtained port name and specifies a printer. Next the processing proceeds to step S1805 and the CPU 201 functions as the bidirectional communication module 601, and lists information of the printers installed in the node 1601 in which it is installed. Then, the processing proceeds to step S1806 and the CPU 201 retrieves the information of a printer at the head of the list of the listed information of printers. Next, in step S1807, it is determined whether or not all the printer information has been completely retrieved from the list, and if so, the processing proceeds to step S1815, and the network communication error 703 is sent back as a response status, and the processing terminates.

Meanwhile, if not all the printer information has been completely retrieved, the processing proceeds to step S1808 and the CPU 201 compares the driver name of the retrieved printer to the driver name added to the name of the printer. Then, the processing proceeds to step S1809 and the CPU 201 determines whether or not the driver names match, and if they do not match, the processing proceeds to step S1806, and information of the next printer is retrieved from the list of printer information and the processing proceeds to step S1807.

Meanwhile, if it is determined that the driver names match in step S1809, the processing proceeds to step S1810, and the CPU 201 compares the IP address of the printer with the IP address specified from the port name. Then, the processing proceeds to step S1811 and it is determined whether or not the IP addresses match, and if they are determined to not match, the processing proceeds to step S1806, and information of the next printer is retrieved from the list of printer information and the processing proceeds to step S1807. If it is determined that the IP addresses match in step S1811, the processing proceeds to step S1812, and a command to request obtainment of the status is issued to the matched printer 1606. Then, the processing proceeds to step S1813, and it is determined whether or not there is a response by the printer 1606 within the predetermined time out duration from when the request to obtain the status was issued. Here, if it is determined that there is no response within the predetermined time out duration, the processing proceeds to step S1815, and, using the RPC 1302, the network communication error 703 is sent back to the status notification application 401, and the processing is terminated. Meanwhile, it is determined that there was a response from the printer 1606 within the predetermined time out duration in step S1813, the processing proceeds to step S1814. The CPU 201 in step S1814 using the RPC 1302 sends back a status obtained from the printer 1606 to the status notification application 401, and terminates the processing.

By virtue of the third embodiment as described above, even if the system employs a server cluster, it is possible to obtain a status of a printer linked to a virtual printer from a client machine.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166185, filed Aug. 25, 2015, which is hereby incorporated by reference herein in its entirety.

What is claimed is:

1. A client computer that displays a status of a printer on a display of the client computer, the client computer comprising:
    at least one memory that stores (a) an operating system having a bidirectional communication module that is capable of communicating with the printer bidirectionally and is not allowed to be customized, (b) a status display application, and (c) a bidirectional communication application; and at least one processor that executes the operating system, the status display application, and the bidirectional communication application, wherein the at least one processor, by executing the status display application and the bidirectional communication application, obtains the status of the printer using the bidirectional communication application without using the bidirectional communication module of the operating system and displays the obtained status of the printer on the display, and wherein the bidirectional communication application is executed with a higher authority than the status display application.

2. The client computer according to claim 1 wherein the at least one processor is configured to display, in a case that the at least one processor, by executing the status display application, issues a request for obtaining the status of the printer to the bidirectional communication application, an error on the display for indicating that bidirectional communication is stopped if the bidirectional communication application cannot operate.

3. The client computer according to claim 2, wherein the at least one processor, by executing the bidirectional communication application, transmits to the status display application an error for indicating that a communication error has occurred in a case where there is no response from the printer in response to the request to obtain within a predetermined duration.

4. The client computer according to claim 1, wherein communication between the status di splay application and the bidirectional communication application is performed using LPC (Local Procedure Call).

5. The client computer according to claim 1, wherein the bidirectional communication module is a language monitor.

6. An information processing apparatus having a language monitor being capable of performing a bidirectional communication with a printer, and for outputting print data to the printer using the language monitor, wherein the printer is able to perform print processing based on the print data, the image processing apparatus comprising:

a status display application that displays a status of the printer; and a bidirectional communication application that communicates with the status display application and is able to perform the bidirectional communication with the printer, wherein the status display application transmits an acquisition request of the status of the printer to the bidirectional communication application, wherein the acquisition request includes information for identifying the printer, wherein the bidirectional communication application transmits the acquisition request to the printer identified by the information included in the acquisition request without using the language monitor and transmits information based on the status of the printer that is received from the printer without using the language monitor as a response to the acquisition request to the status display application, wherein the status display application displays the status of the printer based on the information based on the status of the printer that is received from the printer without using the language monitor in accordance with having received the information based on the status of the printer from the bidirectional communication application, and the status display application is further operable to display a status of the print processing by the printer, and wherein the bidirectional communication application is executed with a higher authority than the status display application.

7. The information processing apparatus according to claim 6, wherein the status display application displays information indicating that the bidirectional communication application stops in a case that the bidirectional communication application does not operate when the status display application transmits the acquisition request to the bidirectional communication application.

8. The information processing apparatus according to claim 6, wherein the bidirectional communication application transmits status information including information indicating that a communication error has occurred to the status display application in a case where a response is not received from the printer within a predetermined time period after the acquisition request has been transmitted, and the status display application that received the status information including the information indicating that the communication error has occurred displays the information indicating the communication error has occurred.

9. The information processing apparatus according to claim 6, wherein communication between the bidirectional communication application and the status display application is performed with an LPC (Local Procedure Call).

10. The information processing apparatus according to claim 6, wherein the information for identifying the printer is name information of the printer, and the status display application operates dependently upon an authority of a user that activates the status display application.

11. A method for controlling a client computer that stores (a) an operating system having a bidirectional communication module that is capable of communicating with a printer bidirectionally and is not allowed to be customized, (b) a status display application, and (c) a bidirectional communication application, the method comprising:

executing the status display application and the bidirectional communication application to obtain a status of the printer using the bidirectional communication application without using the bidirectional communication module of the operating system and to display on a display the obtained status of the printer, wherein the bidirectional communication application is executed with a higher authority than the status display application.

12. The method according to claim 11, further comprising issuing a request for obtaining the status of the printer to the bidirectional communication application by executing the status display application; and displaying an error on the display for indicating that bidirectional communication is stopped if the bidirectional communication application cannot operate.

13. The method according to claim 12, further comprising transmitting to the status display application an error for indicating that a communication error has occurred by executing the bidirectional communication application, in a case where there is no response from the printer in response to the request to obtain within a predetermined duration.

14. The method according to claim 11, wherein communication between the status display application and the bidirectional communication application is performed using LPC (Local Procedure Call).

15. The method according to claim 11, wherein the bidirectional communication module is a language monitor.

\* \* \* \* \*